(12) United States Patent
Moulton et al.

(10) Patent No.: US 8,608,956 B2
(45) Date of Patent: Dec. 17, 2013

(54) CURB INLET CATCH BASIN FILTRATION APPARATUS

(75) Inventors: Matthew Moulton, Portland, OR (US); Stephen McInnis, Portland, OR (US)

(73) Assignee: Cleanway Environmental Partners, Inc., Portland, OR (US)

( * ) Notice: Subject to any disclaimer, the term of this patent is extended or adjusted under 35 U.S.C. 154(b) by 311 days.

(21) Appl. No.: 13/179,698

(22) Filed: Jul. 11, 2011

(65) Prior Publication Data
US 2012/0145612 A1 Jun. 14, 2012

Related U.S. Application Data
(60) Provisional application No. 61/421,468, filed on Dec. 9, 2010.

(51) Int. Cl.
| E03F 5/04 | (2006.01) |
| E03F 5/14 | (2006.01) |
| B01D 29/27 | (2006.01) |
| C02F 103/00 | (2006.01) |

(52) U.S. Cl.
CPC ............. *E03F 5/0403* (2013.01); *E03F 5/14* (2013.01); *B01D 23/04* (2013.01); *B01D 2201/0415* (2013.01); *C02F 2103/001* (2013.01)

USPC ...... 210/163; 210/170.03; 210/232; 210/473; 210/479

(58) Field of Classification Search
USPC ............ 210/162, 163, 164, 170.03, 232, 473, 210/474, 477, 479; 404/2, 4, 5
See application file for complete search history.

(56) References Cited

U.S. PATENT DOCUMENTS

| 5,405,539 | A  | * | 4/1995 | Schneider ..................... 210/163 |
| 5,643,445 | A  | * | 7/1997 | Billias et al. .................. 210/162 |
| 6,884,343 | B2 | * | 4/2005 | Harris et al. .................. 210/163 |
| 8,343,357 | B2 | * | 1/2013 | Horner ......................... 210/162 |
| 2001/0030150 | A1 | * | 10/2001 | Remon ......................... 210/163 |
| 2005/0051499 | A1 | * | 3/2005 | Nino ............................. 210/163 |
| 2005/0183997 | A1 | * | 8/2005 | Happel et al. ................. 210/163 |

* cited by examiner

Primary Examiner — Christopher Upton
(74) Attorney, Agent, or Firm — Hancock Hughey LLP

(57) ABSTRACT

A filtration apparatus for curb vaults may be installed in existing vaults through manhole access openings whenever the smallest dimension of the access opening is greater than the smallest dimension measured across a support plate assembly of the filtration apparatus. An adjustable attachment system allows installation of the filtration apparatus by inserting the apparatus through the access opening.

13 Claims, 4 Drawing Sheets

CURB INLET CATCH BASIN FILTRATION APPARATUS

FIELD OF THE INVENTION

This invention relates to a filtration apparatus for surface water, and more specifically, to a filtration apparatus for removing sediment and other contaminants from surface water and adapted for insertion into curb inlet catch basins.

BACKGROUND

Surface water run-off is coming under increased scrutiny as a source of pollutants entering ground water, streams and rivers. As water from rain or snow melt and other sources flows over the surface of the ground it picks up a wide variety of pollutants, ranging from large and small debris, suspended solids and sediment to oils and other soluble and insoluble chemical contaminants. Because surface water is relatively easily contained through storm sewers and dry wells, many agencies at all levels of the government are paying increased attention to both the contaminants that enter the water system through surface water run-off, and to methods to control and eliminate such contaminants. Moreover, governmental regulations currently in place put restrictions on the amount of sediment that can be permitted to flow into sewer systems.

A municipal storm sewer system is one type of traditional surface water filtering system. In this type of system a series of grated catch basins or collection boxes are interconnected with sewer pipe. Surface water flows through the grate, which catches large objects such as branches, rocks and the like. The water that flows through the grate enters the catch basin, which is a collection box or vault that functions essentially as a settling basin. Such collection boxes are sometimes called sump tanks. Some sediment that flows through the grate settles to the bottom of the basin, and the water flows through an outlet pipe and into the sewer system and, depending upon the system, either to another processing facility or directly into a stream or river.

This traditional system is useful as a primary control system, and is relatively inexpensive, but it has many problems. As examples of the problems, the catch basin can quickly be filled with sediment if the water contains a high level of solids or sediment, causing the catch basin to become filled and the system to overflow or become clogged. Because the catch basin is typically a cylindrical tube or a rectangular box that sits below grade level, cleaning the sediment out of the basin can be a difficult job. Cleaning is made much more difficult if the system is clogged and the basin is underwater. Just as important, the system does not stop all of the sediment and other pollutants in the run-off. Typically, the water flow through the basin is fairly turbulent, especially when there is a lot of water flowing through the system, for instance during a storm. When this occurs very little sediment settles out, and is instead washed through the basin and into the sewer system. This may result in non-compliance with governmental regulations, possibly resulting in fines. Finally, a typical catch basin system does nothing to collect oils and other chemical contaminants and dissolved solids.

The grated catch basin type of system is routinely used with both private and municipal dry wells. In a dry well the surface water that flows through the sump tanks flows into a dry well associated with one or more basins rather than flowing into a municipal or other sewer system. However, to function properly, dry wells must have sufficient flow-through characteristics. Water containing a high level of sediment can quickly clog a dry well by stopping water flow-through. And as noted above, a grated catch basin does not stop oils and other chemicals. These kinds of pollutants, and especially oils that flow through the system can clog dry wells very quickly. Commercial dry wells can be very large, especially if they are used to contain run-off from a large area such as a large private parking lot, and are connected to numerous catch basins. It is typically very expensive to dig a new dry well, or to unclog an existing well.

As noted, many government agencies are paying increased attention to contaminants that are carried into streams and rivers in surface water run-off. Because polluted surface water run-off can be a significant source of pollution, agencies have begun to monitor the levels of contaminants in run-off, both in municipal and private systems. In the past several years, many municipalities have begun to impose fees on catch basin users, whether the catch basin is connected to a storm sewer system or a dry well. While these fees apply in most instances to commercial users, they can also apply to residential systems. In large part the fees are based in some manner on the kind and amount of pollutants that flow through the catch basin and into the system. In general, the higher the level of contaminants flowing through the system, the higher the fee. In some cases the amount of the fee is based on the kind of contaminant. For example, oils flowing into a sewer or dry well can lead to increased fees. These fees even apply to private commercial dry well users, since it is in the interest of a municipality to control the amount of pollution that enters the ground water.

There is therefore a strong incentive to decreasing both the amount and kind of contaminants flowing through a catch basin and into either a municipal sewer system or a private dry well or sewer system. First, there is an obvious environmental incentive: by decreasing contamination of all kinds from surface water run-off, the water that flows back into the ground and into streams and rivers is cleaner. This helps to improve environmental conditions in numerous ways. Second, there is a strong economic incentive: when sewer system and dry well users are paying fees based on the amount and kind of contaminants that flow into their systems, it is of obvious advantage to minimize all contaminants. Further, the costs associated with either cleaning catch basins or reconditioning dry wells are substantial. Avoiding or delaying those costs by reducing the amount of contaminants flowing through the system can save substantial amounts of money.

Curb-inlet catch basins are ubiquitous and are one type of vault used in storm sewer systems and functions the same as the systems described above. However, a curb-inlet catch basin is located along side roadways, typically those that are either paved with asphalt or which are concrete. Water flows off the roadway and enters the catch basin through an opening formed in a roadside curb. While there are numerous different designs for curb-inlet systems, a typical system has a below-grade vault made of reinforced concrete and which is connected to the sewer system through pipes. The vault is generally a square or rectangular box, the upper edge of which is typically at the same elevation as the roadway. A square riser that is the same size as the vault and which also is typically concrete sits atop the vault. The riser is typically the height of the curb. A top unit typically sits atop the riser and defines a plate that rests on the riser and covers the vault. The top unit has a removable manhole cover, almost always round, which allows access to the vault for maintenance.

Given the need to effectively filter debris and contaminants from surface water run-off, various catch basins and other filter systems have been devised. As one example, U.S. Pat. No. 5,284,580 describes a collecting frame for use with a drainage sewer. The system utilizes a basin that fits into the sewer drain and is removable therefrom. The basin has a filtering net for trapping debris that flows into the basin through a sewer cover. An imperforate collecting basin catches particulate matter while tiny particles flow through the system with the run-off water. While this device filters out some particulate matter, it does not stop small particles or oils from entering the sewer system.

Another example of a surface water filter system is disclosed in U.S. Pat. No. 5,405,539. The system disclosed in the '539 patent is inserted into an existing storm drain collection box. A frame supports a sheet of filter medium, such as a woven synthetic material that removes particles as small as 42 microns in diameter. Pneumatic rams hold the filter material and frame in place in the collection box. Silt and other particulate debris collects on the filter compartment until the woven filter is clogged and/or the filter compartment is full, at which time excess drainage water overflows, unfiltered, over the back of the filter drain and into the sewer system. The woven filter is replaced by removing the spent sheet from the collection box and replacing it with fresh material.

Yet another filter system is disclosed in U.S. Pat. No. 5,372,714. This system is adapted for use with buried, below grade catch basins, and utilizes a filter bag made of a woven plastic fabric that is porous, but which captures solids. The filter bag hangs into the catch basin, supported by the overlying grate. When full, the bag is removed by inserting lifting rods into loops of fabric connected to the bag.

Still another example is disclosed in U.S. Pat. No. 6,200,484, which describes a filter system that is installed in preexisting catch basins. The system in the '484 patent describes primary, secondary and tertiary filter components. However, the system of the '484 patent requires a catch basin insert, and the tertiary filter has a relatively low surface area considering the volume of the catch basin insert.

Curb-inlet systems present the same problems as the other systems described above and it is therefore desirable to filter water that flows into the systems. However, curb-inlet systems present unique challenges since the manhole access covers are typically round and the vaults beneath the covers are typically square. And in cases where the manhole access cover is other than round, the access plate to the underlying structures is typically smaller in size than the vault below the access plate. It is very difficult therefore to retrofit a filter system that easily fits through the round manhole cover and securely attaches to the vault. As a result, installation of conventional filtering systems is made very difficult; often the entire top unit has to be removed and a significant amount of labor is required to install the filter system.

There is a need therefore for a filter system that may be easily installed in existing curb-inlet catch basins.

SUMMARY

The curb-inlet catch basis filtration system of the present invention is designed to be installed in existing curb-inlet catch basins that are in turn attached to existing sewer systems and dry well systems. The system of the present invention utilizes a support platform that has a linear edge portion and a curved edge portion and this configuration allows the frame to be easily installed through manhole covers that are smaller than the underlying vault. Adjustable jack bolts are attached to the support platform and attach the platform to the interior of the catch basin so that the platform is totally self-supported in the catch basin.

The support platform suspends a primary and secondary filter system. Run-off flowing into the system preferably must pass through each of the two filters. The inlet into the catch basin through the curb is a traditional inlet grate that prevents large solid particles such as rocks, branches and the like from entering the catch basin. Water flows onto the support platform and is directed into a primary filter, which is defined by a cylindrical perforate screen that has an open upper end and a perforate screen on the lower end; this filter traps solids that flow past the inlet grate. The screen is rigid or semi-rigid and when used supports the secondary filter. A cylindrical filter surrounds the perforate screen on the sides and bottom and the water passes through this secondary filter. The secondary filter comprises a non-woven sediment filter that optionally includes media contained in the filter. When media is incorporated into the tertiary filter, the media selected for this secondary filter depends upon the conditions encountered at a specific location. The media may be specific to absorb oils and petrochemicals, as might be expected in run-off from parking lots. Similarly, oils are often contained in run-off from food processing facilities. Other types of media for removing other contaminants may also be used. Thus, other kinds of filter media that can be used are media specifically designed for filtering out carbohydrates and media designed for binding and thus removing metals. This type of media is used with, for example, catch basins that collect water that has been used as process water in food processing facilities. By filtering out carbohydrates, the facility may be able to reduce the BOD of the water, thereby reducing municipal fees. The screen that defines the primary filter is typically utilized, but it will be appreciated that the secondary filter may be used without the primary filter and the system is functional without the primary screen.

BRIEF DESCRIPTION OF THE DRAWINGS

The invention will be better understood and its numerous objects and advantages will be apparent by reference to the following detailed description of the invention when taken in conjunction with the following drawings.

DETAILED DESCRIPTION

Figure 1:
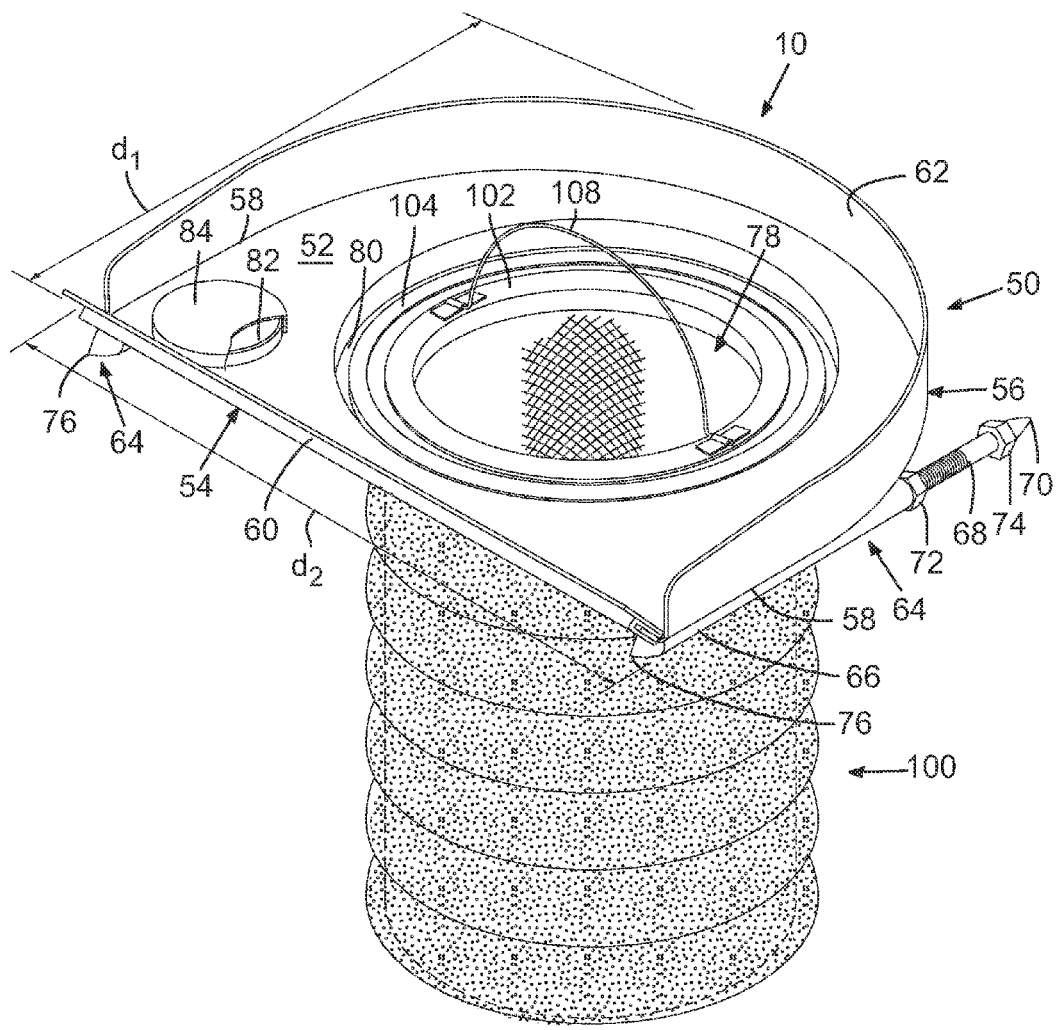
FIG. 1 is a top perspective view of a curb-inlet catch basin apparatus according to the present invention shown in isolation, without the catch basin vault into which the apparatus is installed when in use.

A curb-inlet catch basin filtration apparatus 10 according to the present invention is shown in isolation in FIG. 1 without the curb-side vault into which the apparatus 10 is installed. Filtration apparatus 10 comprises two primary structural components, namely, support plate assembly 50 and filter assembly 100. As detailed below, both the support plate and filter assembly include multiple components. For context, and with reference to FIGS. 1A, 1B and 2, filtration apparatus 10 of the present invention is for installation in existing curbside sewer vaults, identified generally with reference number 12 and also referred to as catch basin 12. A curb-side sewer vault 12 is installed at the side of a roadway at an elevation such that water running off a road surface 14 flows from the road surface and along the curb 16 into an opening 18 into a pre-existing vault 20 that is located below the grade of the road surface 14. Opening 18 typically includes grates 22 that are designed to prevent large objects such as branches and large rocks from flowing into the vault 20. There are numerous kinds of catch basins that are used for vaults such as vault 20. Most typically, vault 20 is a square or rectangular box-like structure made of precast concrete and having an open top but all other sides closed. In the figures, the upper edge 24 of the vault is located approximately at the elevation of road surface 14 and a sidewalk 26 or other similar structure covers the open top of the vault. A manhole 28 provides an opening through the sidewalk 26 into the vault 20 and a removable manhole cover 30 closes manhole 28. Most manholes are round and most manhole covers are therefore also round. However, manhole covers may be found in many different configurations. In the case of a round manhole, the access dimension into the underlying vault is defined as the diameter of the round opening. Where the manhole is some other shape, for instance square or rectangular, the access dimension is the length of the longest diagonal between corners of the opening.

Figure 2:
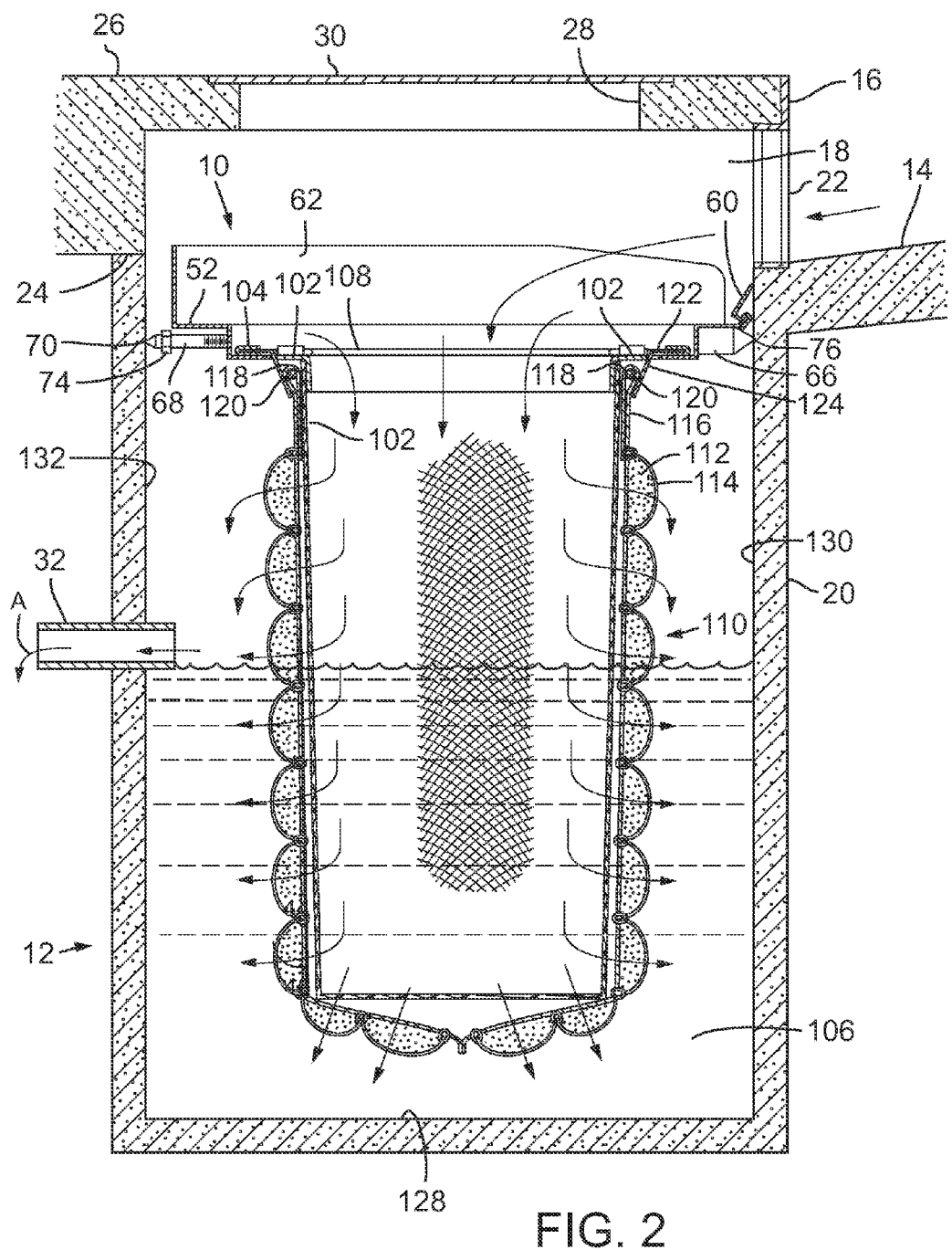
FIG. 2 is a cross sectional elevation view of a curb-inlet catch basin apparatus according to the present invention installed in a catch basin.

With reference to FIG. 2, vault 20 includes an outlet 32, which is typically a pipe attached to other components of the sewer system. As seen with the arrows in FIG. 2, water flowing off the road surface 14 along the flows off the road surface, through the filter assembly 10 of the present invention, and out of vault 20 through outlet 32.

With returning reference to FIG. 1, support plate assembly 50 is defined by a generally planar plate 52 having a linear edge 54 and a rounded edge 56. The rounded edge 56 may be semicircular or, as shown in FIG. 1, may have short linear sections shown generally at 58 extending from the ends of the linear edge which gradually turn into the rounded edge. A flap member 60 is attached to plate 52 along linear edge 54 and extends the entire length of the edge. As detailed below, the flap member may be an integral part of plate 52 or may be a separate component attached to the plate; in either case the flap member 60 acts as a seal along the edge of the support plate. An upwardly projecting rim 62 is attached to plate 52 and extends completely around the plate at rounded edge 56.

Figure 1A:
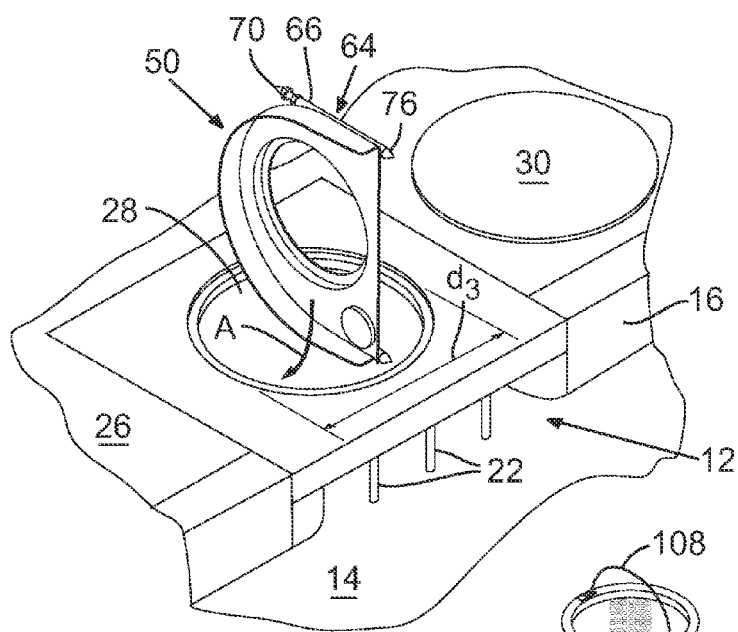
FIG. 1A is a perspective view of a curb-inlet catch basin of the type with which the apparatus according to the present invention is used, showing the support platform being inserted through the manhole cover of the catch basin.
Figure 3:
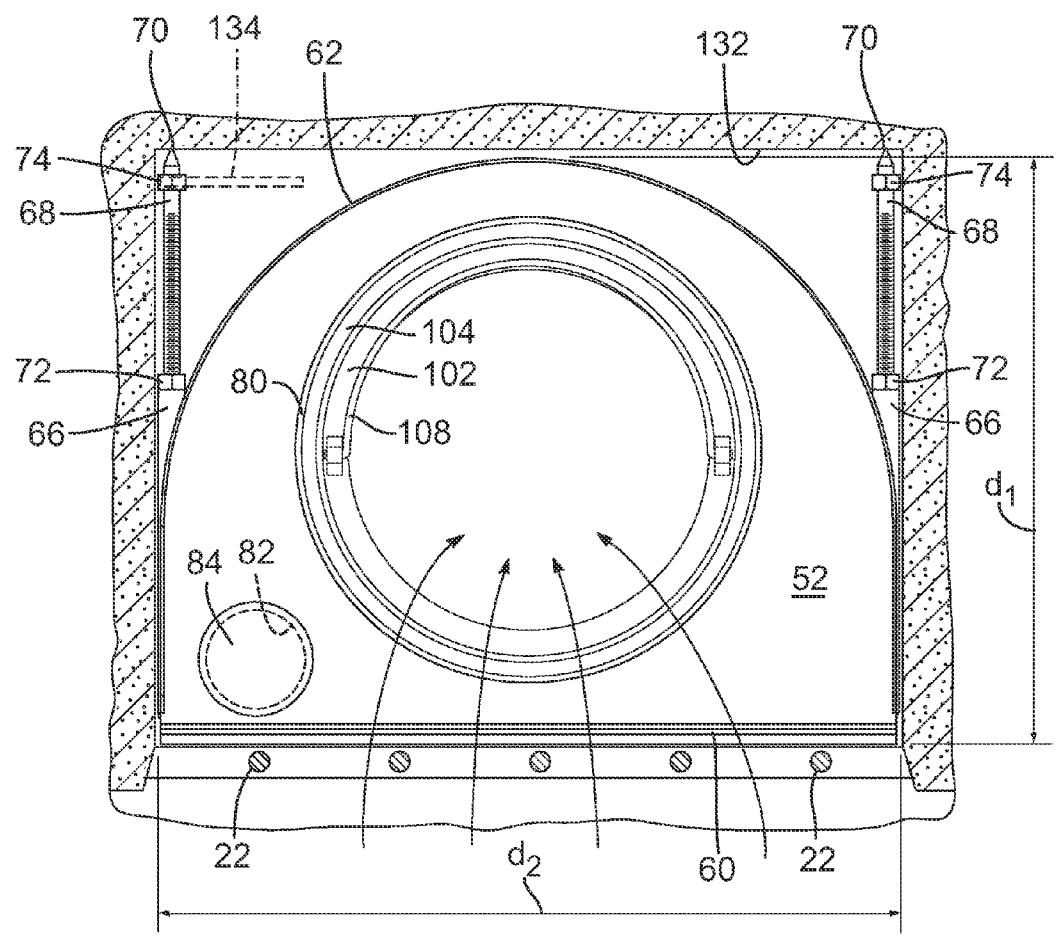
FIG. 3 is a top view of the support platform of the present invention and the catch basin into which the platform is installed, illustrating the water flow path from the road surface into the apparatus.

The width of support plate assembly 50 measured along linear edge 54 is identified as dimension $d_2$ (see FIGS. 1 and 3) and the depth of the support plate assembly measured from linear edge 54 to the opposite edge of the plate at the rounded edge is identified as dimension $d_1$. As noted previously, most manhole covers are round and the access into the vault is thus defined by a round opening having an access dimension defined by the diameter of the opening. In FIG. 1A, the access dimension is identified as dimension $d_3$. As detailed below, dimension $d_1$ is less than the diameter of the opening into the vault, $d_3$, and dimension $d_2$ is greater than the diameter of the opening $d_3$ into the vault. This allows the support plate assembly to be inserted into the vault, through the manhole opening, even though the support plate assembly is in at least one dimension (i.e., $d_2$) larger than the opening $d_3$.

A leadscrew assembly 64 is attached to the lower surface of plate 52 at each of the opposite sides of the plate and extending along the short linear sections 58. The leadscrew assembly comprises a sleeve 66 that is attached to the lower surface of the plate approximately perpendicular to linear edge 54 and which has a hollow interior. A nut 72 is fixedly attached (by, for example, welding) to sleeve 66 and is axially aligned with the sleeve, and an elongate threaded rod 68 is threaded into nut 72 so that the rod moves linearly in the hollow interior of the sleeve 66. Alternately, nut 72 may be replaced where the interior of sleeve 66 is threaded.

The distal end 70 of rod 68 is fabricated so that the distal end may bear against the interior of the vault, as detailed below, and is preferably fashioned into a point as shown in FIG. 1, for example by grinding. An adjusting nut 74 is fixedly attached to rod 68 near distal end 70. Said another way, adjusting nut 74 is not axially rotatable on the rod; when adjusting nut 74 is axially turned rod 68 turns with it. The proximate end 76 of threaded sleeve 66 is pointed in the same manner as the distal end 70 of rod 68. Adjusting nut is optional but preferred since it allows an installation technician to easily rotate rod 68 with a wrench. Nonetheless, the rod may be rotated by other means, such as a pliers or by flattening opposed sides of the rod 68 to allow a wrench to attach to the flattened portions A large circular central opening 78 having a first diameter is formed in plate 52. A circumferential inwardly projecting lip 80 is welded in central opening 78 and defines a second diameter that is smaller than the first diameter. Preferably, a smaller access port opening 82 is formed in plate 52. A port cover 84 covers port opening 82. The access port allows for easy sampling of water that has passed through the filter assembly so that it may be tested to determine the quality of the water after it has been filtered.

Figure 1B:
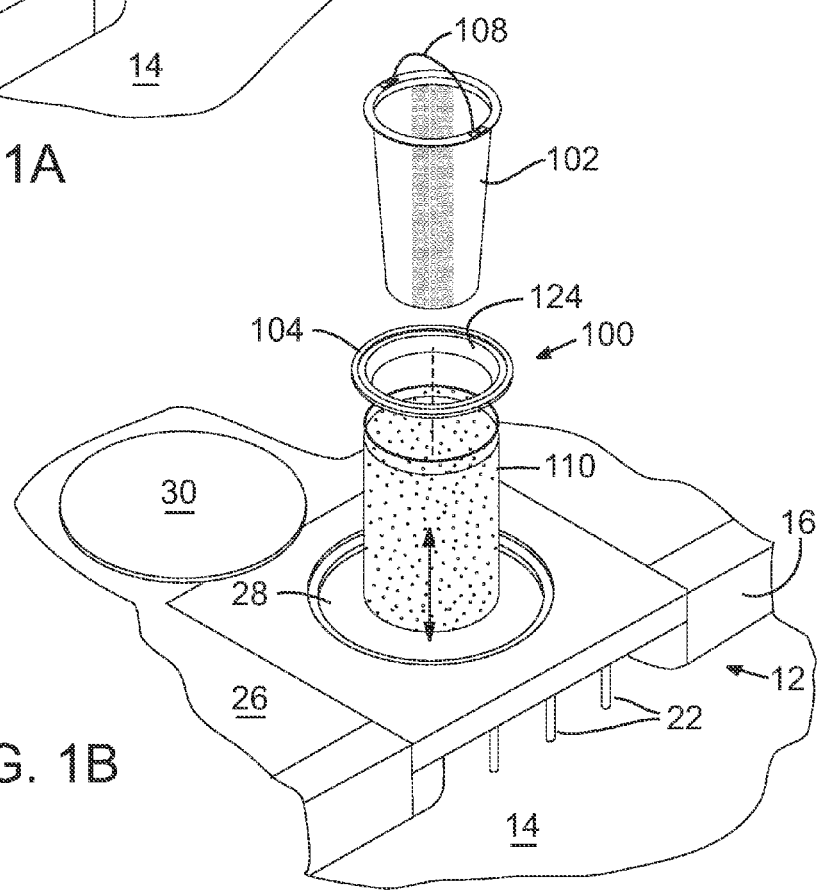
FIG. 1B is a perspective view similar to FIG. 1A, except showing the manhole cover of the catch basin removed and selected components of the curb-inlet catch basin apparatus according to the present invention shown in exploded view.

Filter assembly 100 is best shown in FIGS. 1B and 2 and comprises a cylindrical mesh strainer basket 102 having an upper peripheral lip 104 that is smaller in diameter than the diameter of the large central opening 78 in plate 52. When filter assembly 100 is fitted into opening 78 as shown in FIG. 1, lip 104 rests on the inwardly projecting lip 80 such that the filter assembly 100 is suspended into the space 106 under the plate 52 in the vault 20 (FIG. 2), supported and held in place by the support plate assembly as detailed below. Strainer basket 102 has a downwardly extending cylindrical side wall that extends into the interior space 106 below plate 52 such that the closed bottom of the strainer basket, which may be mesh or solid, is spaced apart from the bottom of the vault 12. Strainer basket 102 is a perforate mesh screen that has plural openings sized to filter out solid debris that flows through opening 18. Preferably, the side wall of strainer basket 102 tapers inwardly from the lip 104 toward the bottom.

Strainer basket 102 is preferably cylindrical but can be of any shape and the size of the perforate openings in the mesh can be varied to accommodate conditions at any given site where apparatus 10 is located. As an example, if the site has a relatively large amount of small solid objects such as small rocks flowing into the system, a strainer basket 102 having perforate openings of an appropriate size can be selected and used. To facilitate easy removal of strainer basket 102 from its position in plate 52, a handle 108 is provided. Because the strainer basket of the preferred embodiment is cylindrical it has substantial surface area to volume ratio and thus has substantial filtering capacity. It can thus be used to filter out a substantial amount of debris before it becomes full or clogged. As particulate matter accumulates within the strainer the basket fills from the bottom toward the top. Water is still able to flow freely through the sleeve until it is completely full.

A secondary filter 110 substantially completely surrounds the exterior surface of strainer basket 102 below plate 52. Secondary filter 110 preferably comprises a filter media 112 that is sandwiched between and supported by inner and outer layers of a mesh fabric material 114 that in the illustrated embodiment of FIG. 2 is formed into tubes that encircle the outer walls of the strainer basket 102 and also the lower bottom of the strainer to substantially enclose the strainer. As such, as best seen in FIG. 2, the secondary filter 110 completely encloses the strainer basket 102. The mesh fabric material 114 is preferably a flexible material that is capable of containing the filter media 112 and through which water readily flows—there are many types of non-woven and woven fabric mesh products that suffice. Preferably, a strip of relatively stronger material such as vinyl strip 116 is sewn to the fabric material 114 around the upper edge of the fabric material to provide a more secure attachment point. The vinyl strip 116 includes a circumferential loop 118 sewn therein at the upper edge thereof and a ring 120 such as a flexible split metal ring is captured in the loop 118. A filter assembly support ring 122 fits within opening 78 and onto lip 80. Support ring 122 includes a downwardly and inwardly sloped shoulder 124. The diameter of metal ring 120 is greater than the diameter of the lowermost extent of shoulder 124, but smaller than the diameter of the opening measured at the uppermost extent of the shoulder 124. Secondary filter 110 suspended from plate 52 by placing the metal ring 120 within shoulder 124 as shown in FIG. 2—since the diameter of ring 120 is less than the diameter at the uppermost point of shoulder 124 yet greater than the diameter of the opening at the lowermost point of the inwardly sloping shoulder, the metal ring defines a locking ring that holds the secondary filter 110 firmly in place with the filter suspended below the upper plate 52.

Installation of filtration apparatus 10 in a preexisting curbside vault will now be detailed. With reference to FIG. 1A, with round manhole cover 30 removed to provide access through manhole opening 28, support plate assembly 50 may be maneuvered through the opening 28 by orienting plate 52 relative to the opening such that the plane defined by the plate is generally perpendicular to the plane defined by the sidewalk 26. The assembly 50 may then be inserted through the opening 28 as shown with arrow A. It may be noted that the assembly may be inserted through the round opening 28 because plate 52 includes rounded edge 56; if plate 52 were square or rectangular to mimic the interior shape and dimension of the vault 20, the plate would not fit through the round opening 28.

Once support plate assembly is inserted through opening 28 it is oriented such that the plane defined by the plate 52 is parallel to the plane of sidewalk 20, as best shown in FIG. 2. The support plate assembly 50 is preliminarily located within vault 20 such that the plate 52 is below the elevation of road surface 14 and such that the bottom of the filter assembly (which is not installed at this time) will be above the bottom surface 128 of the vault. The assembly 50 is moved to the position at which the proximate ends 76 of sleeves 66, which are pointed, bear against the interior wall 130 of the vault 20 that is nearest opening 18. Since the proximate ends 76 are pointed they tend to stay in place against the interior wall 130. In this position, flap member 60 touches interior wall 130 and is below the elevation of road surface 14. Threaded rods 68 are then extended until the distal ends, which are pointed, begin to bear against the interior wall 132 of vault 20 that is opposite interior wall 130. A wrench 134 (shown in dashed lines in FIG. 3) may then be used to turn nuts 74 to further extend threaded rods 68 so that the distal ends 70 bear firmly against the interior wall 134. This causes the proximate ends 76 to be simultaneously forced against the opposite interior wall 132, and also simultaneously compresses or urges the flap member 60 against the interior wall 132. The nuts 74 are turned until the support plate assembly is firmly anchored in vault 20—the four points defined by distal ends 70 and proximate ends 76 bear into the interior walls of the vault and secure the support plate in position.

With support plate assembly 50 secured within the interior of vault 20, the filter assembly 100 may be inserted through manhole opening 28 and then fitted in place on the support plate assembly as described earlier. The manhole cover 30 may then be replaced.

Water flowing from road surface 14 flows onto plate 52. Rim 62 defines a backstop for water, which is channeled into the filter assembly 100. Flap member 60 prevents water from flowing past the support plate assembly 50 between the flap member and interior wall 132 of the vault. It may be seen in FIGS. 2 and 3 that when support plate assembly 50 is positioned in vault 20, the backstop edge defined by rim 62 is spaced apart from the interior wall 134 of the vault. Under normal flow conditions, all water flowing into the system flows into filter assembly 100. However, if the volume of water exceeds the through flow capacity of filter assembly 100—for example, in high volume flows or if the filter assembly is clogged in some manner—excess water will flow over the top of rim 62 and directly into vault 20 without passing through filter assembly 100. In this sense, rim 62 defines an overflow path.

The filter apparatus uses components that are easily removed, cleaned and serviced in the field. For example, filter assembly 100 may be removed to allow filter strainer basket 102 to be cleaned, either by removing the basket and dumping its contents of collected debris, or by other cleaning techniques such as vacuum cleaning. Similarly, basket 102 is easily removed to allow for easy removal and replacement of secondary filter 110. When the media 112 in secondary filter 110 has absorbed its capacity of oil or other contaminants, is clogged or for some other reason requires replacing, the filter 110 can be removed by first removing strainer basket 102, then removing the secondary filter upwardly.

It will be understood that the filtration apparatus 10 according to the present invention may be installed in a vault whenever the opening into the vault has an access dimension $d_3$ that is greater than the dimension $d_1$ defined above. In the most typical situation, the dimension $d_3$ is the diameter of a round opening. In such situations, while the width of the support plate assembly 50 (i.e., dimension $d_2$) is greater than $d_3$, the depth of the support plate assembly (i.e., dimension $d_1$) is less than $d_3$. As such, the support plate assembly may be installed through the access opening as described above and as shown in FIG. 1A. In other situations, for example where the access opening into a vault is square, the access dimension $d_3$ is the length of the diagonal between corners of the square. So long as $d_1$ is less than $d_3$, the filtration apparatus may be installed through the opening without further removal of structures such as covering plates and the like. It will be appreciated that this relationship may be stated as the following general rule: the filtration apparatus 10 may be installed through an access opening whenever the smallest dimension of the access opening is greater than the smallest dimension measured across the support plate assembly. It will be further appreciated that while the embodiments illustrated herein include two leadscrew assemblies 64, more than two such assemblies may be utilized and in some situations a single leadscrew assembly may be used to fix the support plate assembly to the vault. Moreover, the leadscrew assemblies may be oriented at normal angles relative to one another in order to attach the support plate assembly to all four interior walls of a vault.

While the present invention has been described in terms of a preferred embodiment, it will be appreciated by one of ordinary skill that the spirit and scope of the invention is not limited to those embodiments, but extend to the various modifications and equivalents as defined in the appended claims.

The invention claimed is:

1. A filtration apparatus for a run-off vault having a vault interior defined by opposed interior walls, and a manhole opening into the vault interior, the improvement comprising:
    a generally planar support plate that defines a surface onto which run-off flows when said run-off enters said run-off vault, said support plate having an opening therethrough and a linear edge that defines a support plate width having a first dimension and a non-linear edge that defines a support plate depth having a second dimension, where the first dimension is greater than the second dimension;
    at least one leadscrew attached to the support plate, the leadscrew comprising a rod adjustably attached to the support plate so that the rod may be selectively extended from and retracted relative to said support plate,
    a filter in fluid communication with the opening;
    wherein said manhole opening defines a third dimension that is greater than the second dimension but less that the first dimension and wherein the support plate and the at least one leadscrew are inserted into the vault interior through the manhole opening and said support plate is supported in a substantially horizontal orientation in said vault interior only with the at least one leadscrew.

2. The filtration apparatus according to claim 1 wherein the manhole opening is cylindrical.

3. The filtration apparatus according to claim 2 wherein said leadscrew is further defined by a sleeve attached to the support plate and said rod is extendable from and retractable in to said sleeve, and wherein said rod has a distal end adapted for bearing against a first interior wall when said rod is extended from said sleeve.

4. The filtration apparatus according to claim 3 wherein said sleeve has an end adapted for bearing against a second interior wall of said vault that is opposite said first interior wall when said rod is extended from said sleeve.

5. The filtration apparatus according to claim 4 wherein said rod is threaded into said sleeve.

6. The filtration apparatus according to claim 4 wherein the linear edge includes a sealing member extending along said linear edge and adapted for sealing against said second interior wall of said vault.

7. The filtration apparatus according to claim 6 wherein the non-linear edge of the support plate includes a rounded edge portion and an upwardly projecting rim is attached to the support plate along the length of the non-linear edge.

8. The filtration apparatus according to claim 7 wherein said second dimension extends perpendicularly from the middle of the linear edge of the support plate to the rounded edge portion of the support plate.

9. A filtration apparatus for a run-off vault having opposed first and second interior walls that define a vault interior therebetween and a manhole access opening having a manhole access dimension and curb inlet opening into the vault interior, the improvement comprising:
    a support plate having a width defining a first dimension and a depth defining a second dimension, where the first dimension is greater than the second dimension and the second dimension is less that the manhole access dimension so that the support plate is insertable through the manhole access opening into the vault interior for supporting a filter assembly in the vault interior between first and second opposed interior walls of the vault, said support plate defining a run-off carrying surface onto which run-off flows when run-off enters said vault;
    a pair of leadscrew assemblies attached to the support plate, each leadscrew assembling comprising a sleeve adapted for adjustably receiving a rod so that said rod may be selectively extended from and retracted into said sleeve, and each rod having a distal end adapted for bearing against the first interior wall of the run-off vault, and each sleeve having an end adapted for bearing against the second interior wall of the run-off vault;
    wherein said support plate is supported in a horizontal position in said vault interior only with said pair of leadscrew assemblies.

10. The filtration apparatus according to claim 9 wherein the support plate includes a first linear edge and including a sealing member extending along said first linear edge and adapted for bearing against said second interior wall of said run-off vault.

11. The filtration apparatus according to claim 10 wherein the support plate includes a rounded edge portion and an upwardly projecting rim is attached to the support plate along the length of the rounded edge portion.

12. The filtration apparatus according to claim 9 including a first opening in the support plate for supporting said filter assembly.

13. The filtration apparatus according to claim 12 including a second opening in the support plate, said second opening defining a selectively openable access port.

* * * * *